United States Patent [19]
Andrews et al.

[11] Patent Number: 6,048,089
[45] Date of Patent: Apr. 11, 2000

[54] MIXING APPARATUS FOR MAINTAINING A PRESSURE DIFFERENTIAL OVER VARYING FEED RATES

[75] Inventors: Michael John Andrews, Frimley; Christopher Bosher, Reading, both of United Kingdom

[73] Assignee: Thames Water Utilities Limited, Reading, United Kingdom

[21] Appl. No.: 08/797,558

[22] Filed: Feb. 6, 1997

[30] Foreign Application Priority Data

Feb. 6, 1996 [GB] United Kingdom ............... 9602358

[51] Int. Cl.⁷ .................................................. B01F 15/02
[52] U.S. Cl. .................................. 366/151.1; 366/160.2; 366/174.1
[58] Field of Search ................................ 366/132, 142, 366/151.1, 152.1, 160.2, 160.3, 167.1, 174.1, 175.2, 176.1, 176.2, 181.5, 336–340, 349; 138/40, 42, 43, 44, 45, 46

[56] References Cited

U.S. PATENT DOCUMENTS

| 3,880,191 | 4/1975 | Baumann . | |
|---|---|---|---|
| 3,955,591 | 5/1976 | Baumann . | |
| 4,440,314 | 4/1984 | Vetter et al. | 366/160.3 |
| 5,366,288 | 11/1994 | Dahllof et al. | 366/176.2 |
| 5,556,200 | 9/1996 | Ekholm et al. | 366/176.2 |

FOREIGN PATENT DOCUMENTS

95/02448   1/1995   WIPO .

*Primary Examiner*—Charles E. Cooley
*Attorney, Agent, or Firm*—Evenson, McKeown, Edwards & Lenahan, P.L.L.C.

[57] ABSTRACT

The invention relates to a mixing apparatus for maintaining a pressure differential over varying feed rates by mixing a flow of sludge with a flocculant. The mixing apparatus includes a monitor for monitoring the pressure differential across the apparatus and a device for varying the size of an orifice in the apparatus through the sludge flows. The orifice size is dependent on the monitored pressure differential to maintain a desired differential pressure over a range of sludge feed rates.

10 Claims, 3 Drawing Sheets

MIXING APPARATUS FOR MAINTAINING A PRESSURE DIFFERENTIAL OVER VARYING FEED RATES

The invention relates to a mixing apparatus, and particularly to such apparatus as is used in the dewatering, i.e. thickening of sewage sludge

BACKGROUND OF THE INVENTION

In such systems, flocculant, usually a polymer flocculant, is added or "dosed" to a sludge being dewatered in a plate press system which incorporates a belt press. Polymer is expensive, and the normal tendency of an operator when dewatering is nor progressing sufficiently well is to add more polymer. However, in addition to the expense, this does not necessarily improve the dewatering efficiency. Moreover, it has been found that on optimisation of polymer sludge conditioning variable mixing control has been identified as a desideratum to improve performance of sludge dewatering equipment. If the correct mixing energy is imparted at the right time then dry solids yield would be increased and polymer demand reduced during sludge conditioning using polymer addition.

It is accordingly an object of the invention to seek to provide mixing apparatus which mitigates the aforesaid disadvantages and seeks to optimise an optimum mixing energy over a range of sludge feed rates.

According to one aspect of the invention there is provided mixing apparatus for mixing a flow of sludge comprising means to monitor pressure differential across the apparatus, and means to vary the size of an orifice of the apparatus, dependent on the pressure differential, whereby to maintain a desired differential pressure over a range of feed rates to the apparatus.

The apparatus may comprise a mixing chamber with a plate valve adapted to determine the size of the orifice. This is a relatively simple yet efficient apparatus.

The orifice may comprise an outlet orifice of the chamber. This provides for ready control.

There may be means adapted to vary addition of flocculant to the sludge dependent on the pressure differential. This is a relatively simple way to control polymer dosage, particularly where the means may comprise electronic means adapted to actuate a flocculant dosing element for dosing the sludge with flocculant.

The dosing element may comprise a polymer flocculant dosing pump. This is a relatively straightforward means for adding polymer flocculant to the sludge.

The means to monitor the pressure drop may comprise a pressure sensor at an inlet side of the apparatus and a pressure sensor at the outlet side of the apparatus, the two sensors providing a control signal to the means to vary the size of the orifice. This system can provide for automatic control of the apparatus.

The means to vary the size of the orifice may comprise an electronic actuator operatively connected with the plate valve. This provides for positive control, whether automatic or not.

The plate valve may comprise an inclined plate. This provides for positive control of outlet orifice size.

According to a second aspect of the invention, there is provided a sewage dewatering system, incorporating a mixing apparatus as hereinbefore defined.

The system may suitably be a belt press system.

According to a third aspen of the invention, there is provided a method of treating a sewage sludge prior to dewatering, comprising providing a flow of sludge through a mixing apparatus, measuring a pressure differential across the mixing apparatus, and maintaining a desired differential pressure over a range of flow rates.

Mixing apparatus embodying the invention is hereinafter described, by way of example, with reference to the accompanying drawings.

DESCRIPTION OF THE PREFERRED EMBODIMENT

Figure 1:
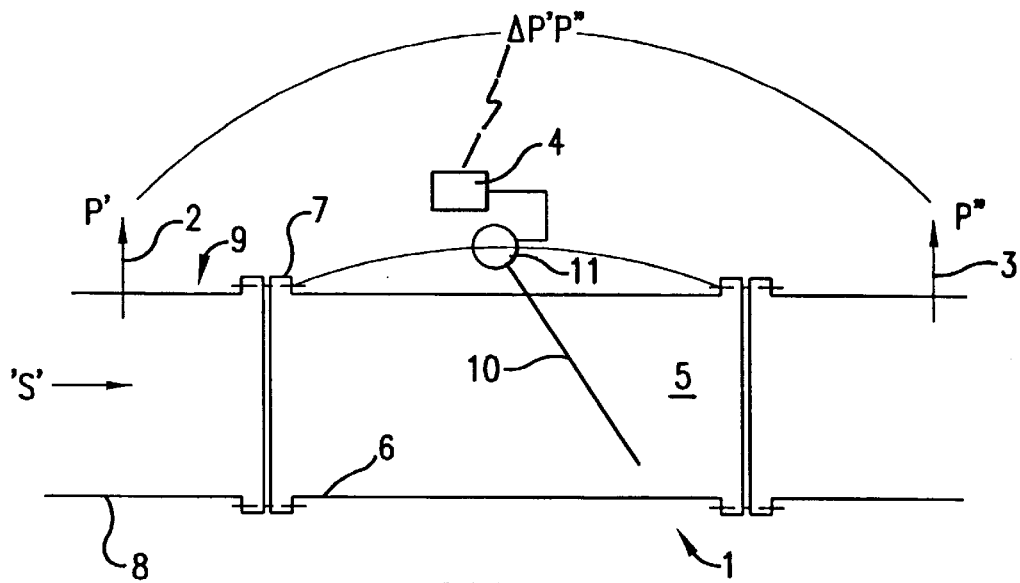
FIG. 1 is a schematic side view of an embodiment mixing apparatus according to the invention.

Referring to the drawings, there is shown mixing apparatus 1 for mixing a flow of sludge 'S' (which is to be dewatered) comprising means 2, 3 to monitor pressure differential across the apparatus 1, and means 4 to vary the size of an orifice 5 of the apparatus 1 dependent on the pressure differential 3, whereby to maintain a desired differential pressure over a range of sludge feed rates to the apparatus.

Figure 2:
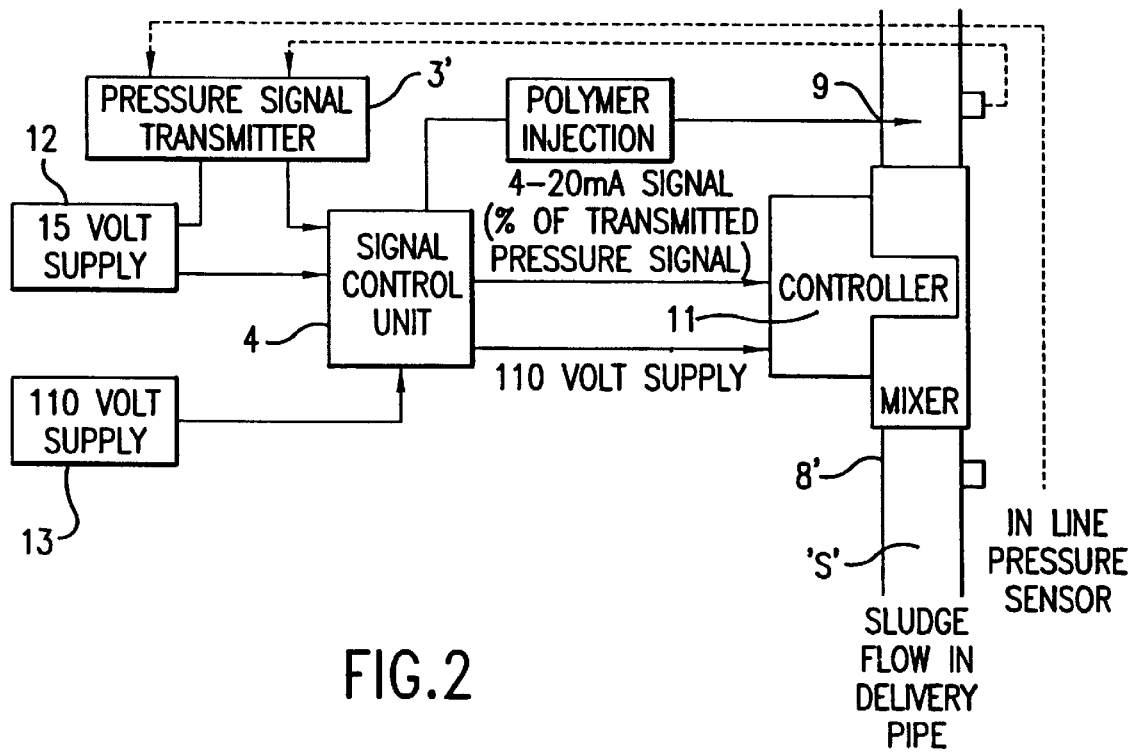
FIG. 2 is a schematic arrangement of a mixing energy control system for the apparatus of FIG. 1.

The apparatus 1 is in the embodiment in the form of a mixer which has a chamber 6 which is adapted by flanges 7 for insertion in and connection with a pipe line 8 along which liquid, in this case sewage sludge to be dewatered, is passed to a plate press (not shown) for coagulating or increasing the solids' content of the sludge. In such a system (FIG. 2) coagulation is assisted or enhanced by the addition of a flocculant or coagulant upstream of the mixing apparatus 1 at 9. The sludge and polymer flocculant is thus thoroughly mixed in the chamber 5, the polymer being added at the dosing point upstream 9 of the mixing apparatus and exiting the chamber mixed with sludge along a delivery pipe 8' to pass to the dewatering belt of the plate press (not shown). The mixing is controlled by a variably inclinable plate valve 10 which effectively controls the size of the outlet orifice 5 from the chamber 6 of the apparatus 1 in which the plate valve is mounted, though that valve may not be located actually at the orifice.

The outlet orifice from the chamber is thus downstream of the plate valve 10 and an inlet orifice is upstream of the plate valve.

In order to provide optimum setting of the plate valve, and hence optimum mixing and optimum dosing of polymer flocculant over a range of sludge flows, the pressure differential monitoring means 2, 3 is in the form of a pressure sensor 2 upstream of the mixing apparatus 1 and a pressure sensor 3 downstream of the mixing apparatus 1, the sensors being of any convenient kind and each generating an electronic signal which is transmitted to the pressure sensor signal unit 3', which generates a signal of pressure differential, $\Delta P'P''$ or difference between the upstream pressure P' and downstream pressure P'' and transmits that differential to the signal control unit 4. That signal controls the amount of polymer flocculant dosed to the apparatus at 9, and the size of the outlet orifice by actuating a controller 11 for the plate valve 10 angle of inclination.

There are suitable power supplies provided 12, 13.

Figure 3:
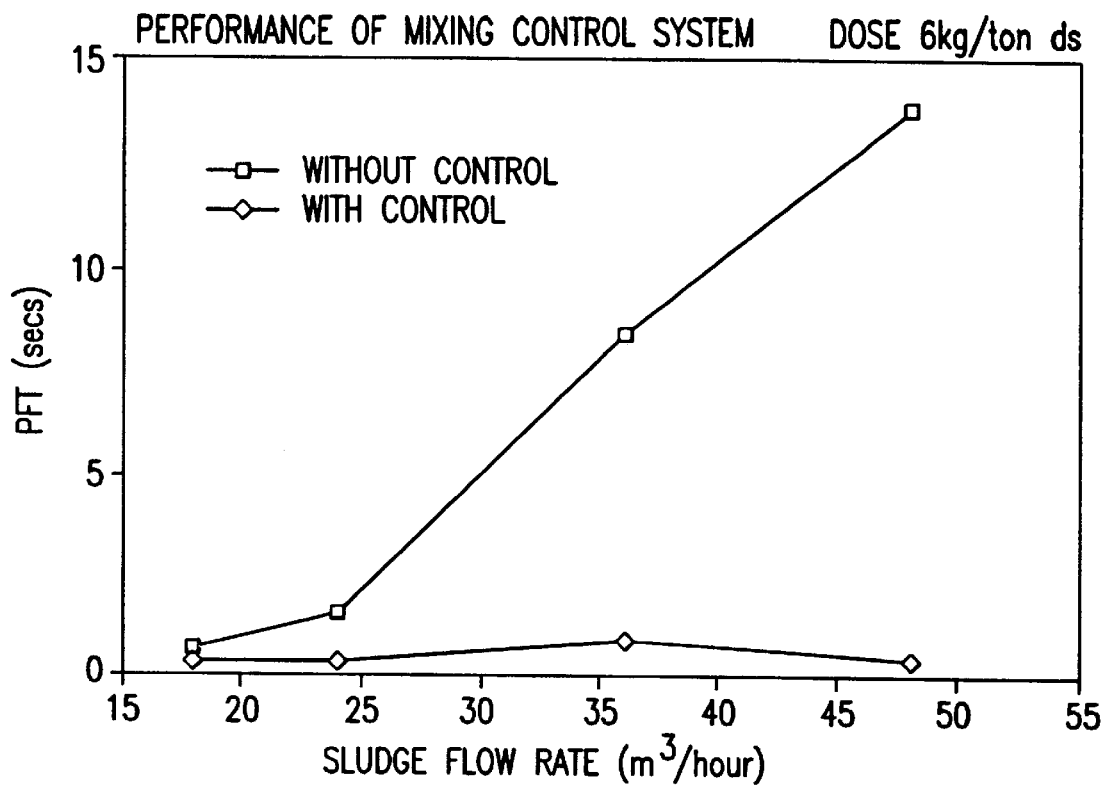
FIGS. 3 and 4 show graphically different parameters for operation with and without control of apparatus according to FIGS. 1 and 2.
Figure 4:
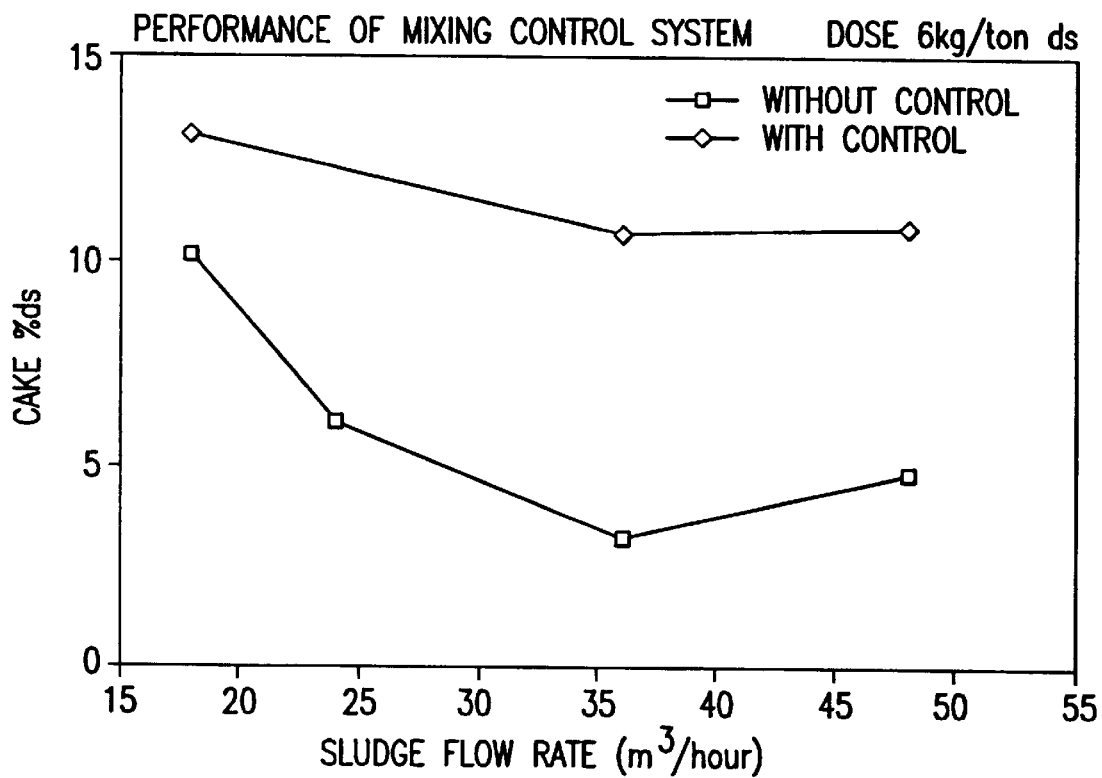

FIGS. 3 and 4 show respectively graphically the results achieved.

FIG. 3 shows plots of low pressure filtration rate (PFT) against sludge flow rate (to the mixing apparatus) and FIG. 4 the percentage of solids (cake % ds) against sludge flow rate, both with and without control. The graphs show that control is favourably, enhanced using the apparatus described with reference to the drawings. This mixing apparatus as described provides a control system which enhances mixing energy control on plate presses, where the sludge feed rate is widely variable during a fill/press cycle.

Sludge conditioned with the control system in place maintains excellent filterability in sludges (i.e. a low pressure filtration rate—PFT) and good cake solids' yield across a complete range of flows (up to 50 m$^3$ and beyond).

Without the control system in place, excess shear is generated in the mixer as the flow increases, resulting in decreased filterability and reduced cake dry solids. Under these conditions a large increase in polymer demand is exhibited. However, even when the polymer dose is, increased, the filterability of the sludges improves only marginally.

Using mixing apparatus embodying the invention it has been found that if the correct mixing energy can be imparted at the, right time, then the dewatered dry solids' yield can be maximised and the polymer demand reduced.

This optimum energy is proportional to the pressure drop across the mixer. With too large a pressure drop the mixing energy is excessive and causes the floc to over shear into smaller floc which have less free supernatant, and dewater badly. Conversely, with too small a pressure drop, the shear imparted is insufficient to utilise fully a 'normal' polymer dose and the sludge exhibits a higher polymer demand in order successfully to build good, shear stable floes.

Thus the system embodying the invention incorporates actuated control of the mixing valve whilst still allowing for free movement for release of pressure during unusual surges. The actuator on the mixer is driven by a differential pressure transducer signal which is damped by a suitable unit thus minimising any unnecessary valve movement. The apparatus is, it will be understood, initially calibrated with a specified or desired optimum pressure drop across the mixer. During subsequent operation, it then maintains this pressure drop, and thus mixing energy, across the full range of flow velocities during a press cycle, thereby optimising performance and minimising polymer requirements.

Results of several trials shown in FIGS. 3 and 4 clearly show the benefits of controlling mixing energy across a range of sludge flows in terms of good filterability (measured by low pressure filtration test (PFT) values of <2 seconds) and enhanced cake solids (measured with a piston press).

It will be understood too that the quantity of polymer dosed into the sludge flow can then be maintained in the correct proportion. Indeed up to 25% saving in polymer can be achieved. This is achieved by varying the actual quantities dosed using actuated control of the polymer pumps driven by changes in sludge volume flow and solids content.

Moreover, signal data from the flow pressure differential readings can be combined with other data, for example sludge density data which can be measured and monitored. The two sets of data can be combined, with suitably damped signals to ensure pump inverters for polymer closing are not constantly varying. This can be achieved by using a data processing unit which can average the input values and only activate the pump inverters if the rate of change is greater than, say, a 5% threshold. Such a process control unit could also incorporate many other functions including digital outputs for operator alarm signals if readings wildly fluctuate as well as analogue outputs for logging purposes. The process unit may be programmable and therefore could allow the system to be intelligent, responding to any conditions specified and could be individually tailored to site specific problems, i.e. alarmed if % ds falls below a set value.

Figure 5:
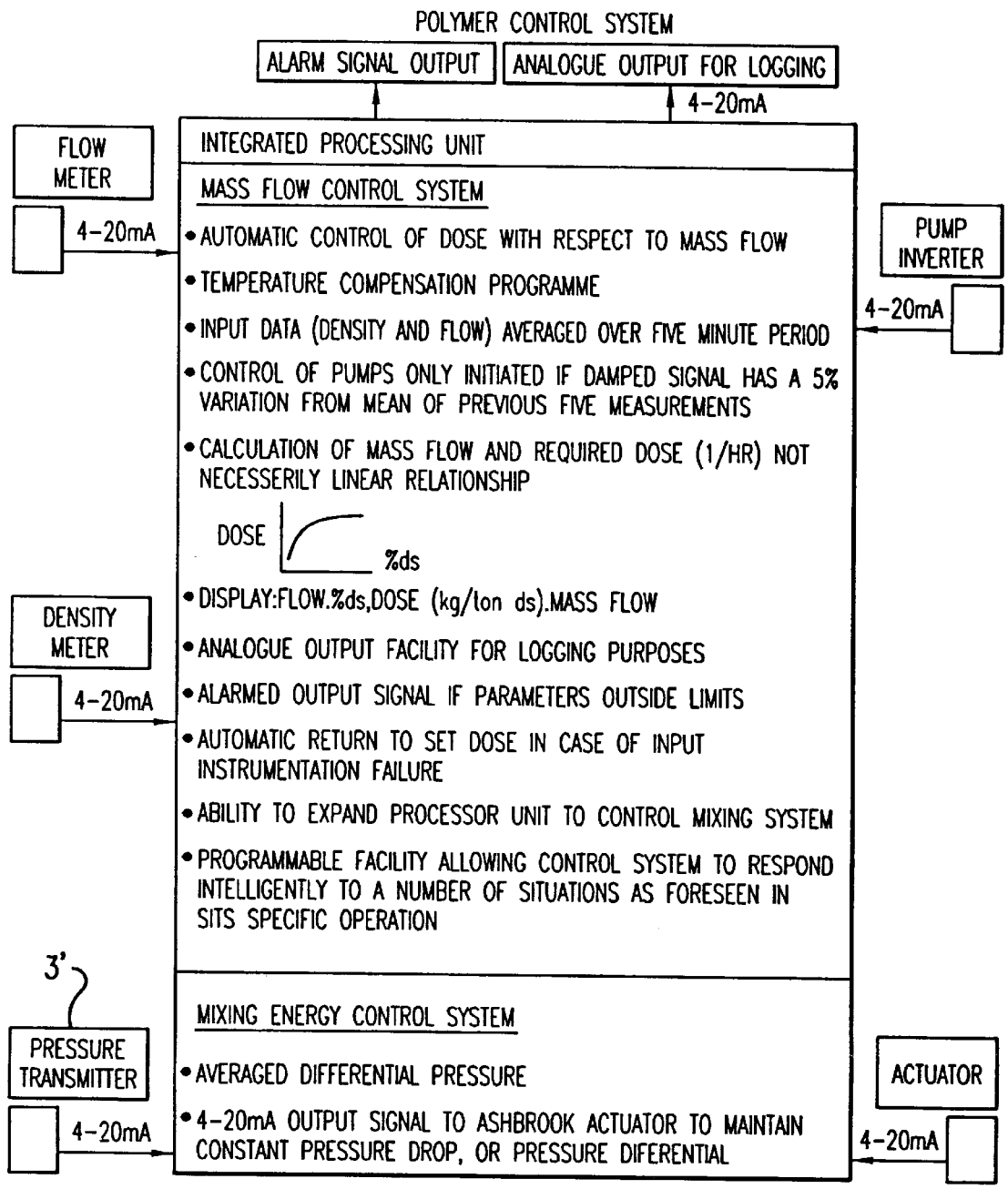
FIG. 5 shows a control system incorporating mixing apparatus of FIGS. 1 and 2 in combination with a sludge density meter system.

Such a polymer control system is shown schematically in FIG. 5.

Thus, a mixing apparatus embodying the invention will maintain optimum mixing energy across a full operating range of sludge flow velocities and other relevant sludge characteristics, thus optimising press performance and minimising polymer requirements.

We claim:

1. Mixing apparatus for mixing a flocculant into a flow of sludge comprising:
   (i) means to monitor pressure differential of the flow of sludge across the apparatus;
   (ii) means to vary the size of an orifice in the apparatus through which the sludge flows, based on the monitored pressure differential, to maintain a desired differential pressure over a range of sludge feed rates to the apparatus; and
   (iii) means adapted to vary addition of the flocculant to the flow of sludge dependent on the pressure differential.

2. Mixing apparatus as defined in claim 1, wherein the apparatus comprises a mixing chamber with a plate valve adapted to determine the size of the orifice.

3. Mixing apparatus as defined in claim 2, wherein the orifice comprises an outlet orifice of the chamber.

4. Mixing apparatus as defined in claim 2, wherein the means to monitor the pressure differential comprises a pressure sensor at an inlet side of the apparatus and wherein there is a pressure sensor at the outlet side of the apparatus, whereby the two sensors provide a control signal to the means to vary the size of the orifice.

5. Mixing apparatus as defined in claim 4, wherein the means to vary the size of the orifice comprises an electronic actuator operatively connected with the plate valve.

6. Mixing apparatus as defined in claim 2, wherein the plate valve comprises an inclined plate.

7. Mixing apparatus as defined in claim 1, wherein the means for varying the addition of flocculant comprises electronic means adapted to actuate a flocculant dosing element for dosing the sludge with flocculant.

8. Mixing apparatus as defined in claim 7, wherein the dosing element further comprises a polymer flocculant dosing pump.

9. A sewage dewatering system, comprising a mixing apparatus for mixing a flocculant into a flow of sludge comprising:
   (i) means to monitor pressure differential of the flow of sludge across the apparatus;
   (ii) means to vary the size of an orifice in the apparatus through which the sludge flows, based on the monitored pressure differential, to maintain a desired differential pressure over a range of sludge feed rates to the apparatus; and
   (iii) means adapted to vary addition of the flocculant to the flow of sludge dependent on the pressure differential.

10. A system as defined in claim 9, wherein the dewatering system further comprises a belt press system.

\* \* \* \* \*